E. CHALMERS.
SWIVEL.
APPLICATION FILED JAN. 31, 1913.

1,104,408.

Patented July 21, 1914.

UNITED STATES PATENT OFFICE.

ERNEST CHALMERS, OF BIRMINGHAM, ENGLAND.

SWIVEL.

1,104,408.  Specification of Letters Patent.  Patented July 21, 1914.

Application filed January 31, 1913. Serial No. 745,482.

*To all whom it may concern:*

Be it known that I, ERNEST CHALMERS, a citizen of Great Britain, residing at Buckingham street, Birmingham, county of Warwick, England, Manufacturer, have invented certain new and useful Improvements in Swivels, of which the following is a specification.

This invention comprises improvements in and relating to swivels and has for its object to provide an improved construction which enables these articles to be more easily and cheaply made.

It is the usual custom to form the hook part of the swivel with a solid end portion or body either integral or secured thereto and this body has a projecting end which forms a shank for a connecting ring to turn upon, the shank being riveted over at the back of the ring to anchor it while permitting free rotation. I provide an inclosing cap or shell to pass over the end or body of the hook portion and arrange this cap or shell to swivel as a whole upon the body. I prefer also to form the body in a special way to enable it to be cheaply produced but my invention is not restricted to this special formation of the body.

In order that the invention may be thoroughly understood and easily carried into practical effect I have appended hereunto a sheet of explanatory drawings.

Figure 1:
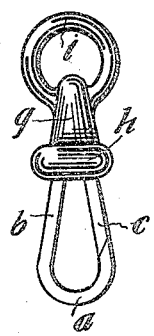
Figure 2:
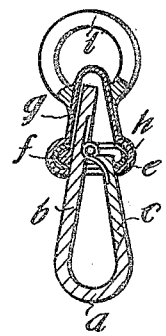
Figure 3:
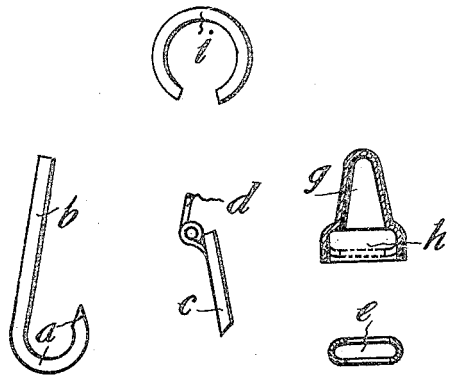

Figure 1 is an elevation of a swivel made in accordance with my invention. Fig. 2 is a sectional view thereof. Fig. 3 is a view of the parts that make up the swivel.

In the example shown at Figs. 1, 2, and 3, I employ the hook part $a$ and extend the shank part $b$ thereof and hinge the spring guard portion $c$ to this shank. The guard $c$ may be hinged in any suitable manner to the shank part $b$, but I prefer to secure an end of a simple coil spring $d$ to each part by soldering or any other means, thus forming the hinge and giving the necessary spring action. I form a collar $e$ preferably by pressing, and secure this collar around the shank $b$ of the hook part $a$ by means of soldering it to the part $b$ as at $f$ or by any other means. This collar is preferably rounded on the exterior as seen at Figs. 2 and 3. I then form by pressing, or in any other way, an inclosing shell or cap such as $g$ which is passed over the end of the shank $b$, and the socket part $h$ passes over the collar $e$ and is spun or otherwise turned over it into the shape shown to anchor it in place. The inclosing shell or cap $g$ is capable of turning freely on the contour of the collar $e$ so that the connecting ring or bow $i$ may be secured by soldering or otherwise to the shell or cap $g$. This is the preferred construction as it enables a material saving in the cost of production to be made. It will be understood, however, that I do not intend to limit myself to the preferred form of construction, but contemplate such modifications thereof as are mechanically equivalent to the arrangement shown and described herein.

By this invention I provide a neater and simpler swivel and one which may be very cheaply produced.

What I claim then is:

1. A swivel comprising a hook and a spring guard portion for said hook, an attachment portion and a shell inclosing the shank of said hook, said attachment portion comprising a bow which is secured to said shell; a collar secured around the shank of said hook and said inclosing shell being bodily rotatable upon said collar.

2. As an article of manufacture a swivel made from a hook part provided with a shank, a shaped and pressed collar secured around said shank, a guard for said hook and a pressed up hollow shell, said shell inclosing the shank of said hook and being rotatably mounted to the said pressed collar, substantially as described.

In testimony whereof, I, ERNEST CHALMERS, have signed my name to this specification in the presence of two subscribing witnesses, this twenty-second day of January 1913.

ERNEST CHALMERS.

Witnesses:
F. GILBERT BRETTELL,
E. BRETTELL.